United States Patent [19]
Levin

[11] 3,779,488
[45] Dec. 18, 1973

[54] ELECTRIC SYSTEM OF A DEVICE FOR DEICING THE SURFACE OF THINWALLED STRUCTURES

[76] Inventor: Igor Anatolievich Levin, ulitsa Stepana Supruna, 12, kv. 74, Moscow, U.S.S.R.

[22] Filed: Feb. 15, 1972

[21] Appl. No.: 226,522

Related U.S. Application Data

[63] Continuation of Ser. No. 826,204, May 20, 1969, Pat. No. 3,672,610.

[30] Foreign Application Priority Data
June 24, 1968 U.S.S.R............................874080

[52] U.S. Cl.......................... 244/134 A, 244/134 D
[51] Int. Cl............................................ B64d 15/00
[58] Field of Search................ 114/222; 244/134 R, 244/134 A, 134 D; 320/1; 307/8, 9

[56] References Cited
UNITED STATES PATENTS
3,257,637  6/1966  Henry .............................. 320/1 UX
3,549,964  12/1970  Levin et al. ...................... 244/134 A
2,946,924  7/1960  Gerlach et al. ...................... 320/1 X
3,129,366  4/1964  Fry...................................... 320/1 X FOREIGN PATENTS OR APPLICATIONS
1,031,166  10/1956  Germany ............................ 114/222
1,267,554  4/1966  Germany............................ 244/134 R Primary Examiner—Milton Buchler
Assistant Examiner—Gregory W. O'Connor
Attorney—Waters, Roditi, Schwartz & Nissen

[57] ABSTRACT

A system is disclosed for deicing the skin surface of aircraft and comprises a power supply unit to which are connected an electrical power accumulator and a program switch. Low inertia converters such as magnetostrictive vibrators are provided in close proximity to the skin surface and are fed from the power supply unit via key switches each having one input connected to the electrical power accumulator while its second input is connected to the program selector switch such that the switch will produce successive single or bundles of electrical pulses separated by pauses at the converters.

3 Claims, 3 Drawing Figures

ELECTRIC SYSTEM OF A DEVICE FOR DEICING THE SURFACE OF THINWALLED STRUCTURES

This application is a continuation of earlier copending application Ser. No. 826,204 now U.S. Pat. No. 3,672,610.

The present invention relates to devices for deicing the surfaces of thin-walled structures under formation of ice formation conditions.

More particularly the present invention relates to devices for deicing the skin surfaces of aircraft, vessels or ships, as well as the surfaces of antennas or aerials. However, the invention can also be employed in a variety of transport facilities as well as in a diversity of other type of apparatus, equipment and design structures.

Known in the present state of the art are devices adapted for deicing the surfaces of thin-walled structures by virtue of building up continuous ultrasonic-or audio-frequency oscillations on the surface of the skin of the above-mentioned thin-walled structures. These devices feture an electric power system, wherein the power supply unit is connected via an ultrasonic- or audio-frequency generator to converters adapted for converting the electrical signals into mechanical signals, said converters being provided in a close proximity to the skin to be deiced. A disadvantage of the above mentioned devices is that a large amount of electric power is continuously consumed for the deicing process.

It is an object of the present invention to eliminate the above-mentioned disadvantage.

A main object of the present invention is to provide an electric system for a deicer device, wherein the electric power consumption continuously drawn from a power supply source, is substantially decreased.

Said object is accomplished due to the fact that in an electric system of a device adapted for deicing the surfaces of thin-walled structures, (e.g.) the skin surfaces of aircrafts) wherein the power supply unit is connected via at least one electric power accumulator to converters capable of converting electric pulses into mechanical pulses, said converters being provided in a close proximity to the skin to be deiced, a key switch is provided before each of the above-mentioned converters adapted to convert electric pulses into mechanical pulses such as a controlled semiconductor diode one of whose inputs is connected to the electric power accumulator, whereas a second input is connected to a program selector switch connected to the power supply unit, said program selector switch being adapted for switching the respective key switch to said electric power accumulator.

Such an electric power system is adapted to feed pulses to the skin surface to be deiced, said pulses being in fact a single oscillation, that is to feed single pulses.

The deicer device of the character set forth hereinabove featuring afore-mentioned electric power system, can be referred to as an electric-pulse deicer.

It is advantageous to feed pulses to the skin surface to be deiced pulses are essentially a few oscillations, or a so-called "bundles of waves." This being the case, said object is accomplished by the provision of an electric power system, wherein a power supply unit is connected via an ultrasonic-or audio-frequency pulse generator, to converters capable of converting the electric oscillations into mechanical oscillations, said converters being provided in a close proximity to the skin surface to be deiced. According to the invention, provision is made before each of the converters adapted to convert electric oscillations into mechanical oscillations for a key switch such as an electron tube, one of whose inputs is connected to a generator adapted to produce ultrasonic-frequency electric oscillations, via a modulator controlled by the aforesaid pulse generator, whereas the second input of said key switch is connected to the power supply unit through a program selector switch, said program selector switch being adapted for switching the respective key switch to said modulator.

The deicer device featuring such an electric power system, can be referred to as an ultrasonic-pulse deicer.

It is advantageous that provision be made before each of the converters adapted to convert electric oscillations into mechanical oscillations, of a power amplifier one of whose inputs is connected via a program selector switch to a modulator, whereas the second input of said power amplifier is connected to a key switch, one of whose inputs is connected via both the electric power accumulator and the program selector switch to the power supply unit, while the second input of said key switch is connected to a pulse generator. Such an electric power system provides the possibility to accumulate electric power within the time spaces between consecutive "bundles of waves," whereby the average amount of power consumed is decreased, with resultant augmentation of the energy of the pulse involved.

The electric power system, according to the present invention, makes it possible to decrease the amount of electric power drawn by the herein-disclosed deicer device and to raise the reliability thereof, this being due to the fact that should one of the converters fail to operate, the rest of the converters, provided in close proximity to the skin surface to be deiced, continue to operate irrespectively.

An embodiment of the present invention will be described hereinbelow by way of example with reference to the accompanying drawings wherein.

Figure 1:
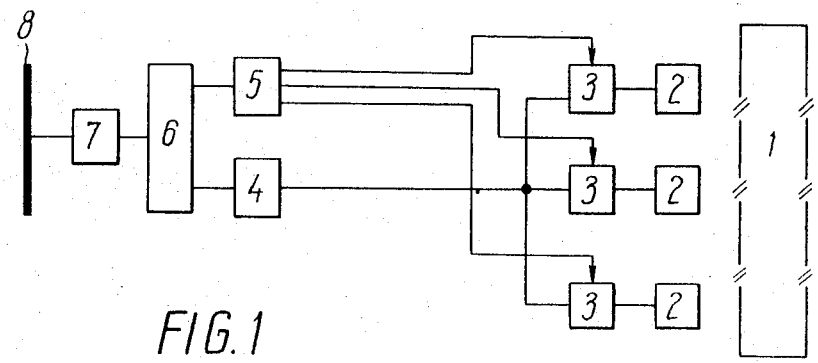
FIG. 1 is a block diagram of a device for deicing the surface of a thin-walled structure, according to the invention, and adapted to feed single pulses.

In FIG. 1, provided in a close proximity to a sheet skin 1 of an aircraft (not shown, are converters adapted to convert electric pulses into mechanical pulses. To make the converters capable of converting electric pulses into mechanical pulses, use is made of electromagnetic induction coils 2 placed on the inside of the skin to be deiced. The pulses fed to the skin are capable of exerting forces thereupon to create elastic strains within the area being deiced. To decrease the losses of electromagnetic field occurring between the electromagnetic induction coil 2 and the sheet skin 1, the gap therebetween must be as small as possible to meet the manufacturing specifications, whereas the shape of the electromagnetic induction coil should follow or resemble the shape of the skin to be deiced.

A key switch 3 is placed before each of the electromagnetic induction coils 2. A controlled diode may be employed as the above-mentioned key switch 3.

The output of the key switch 3 is connected to the electromagnetic induction coil 2. One of the inputs of the aforementioned key switch is connected to an electric power accumulator such as a capacitor 4, whereas the second input of said key switch is connected to a program selector switch 5. Both the capacitor 4 and the program selector switch 5 are connected to a power supply unit 6 which in turn is connected to a power supply line 8 via a switch 7.

The electric power system according to the abovedescribed circuitry is capable of feeding single pulses to the electromagnetic induction coil 2.

Figure 2:
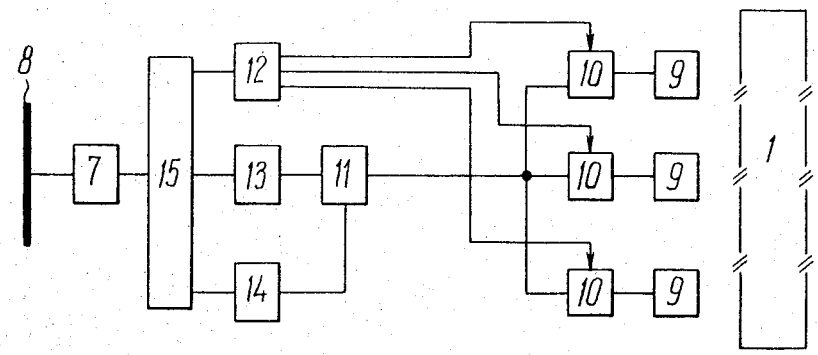
FIG. 2 is a block-diagram of the device of FIG. 1 adapted to feed a "bundle of waves," according to the invention.

To obtain a "bundle of waves" which is fed to one of the converters adapted to convert electric oscillations into mechanical oscillations, the electric power system may be as shown in the block diagram represented in FIG. 2.

Provided in a close proximity to the skin 1 are the converters capable of converting electric oscillations into mechanical oscillations. Utilized as the aforementioned converters may be magnetostrictive vibrators 9 located on the inside of the skin 1.

A key switch 10 is provided before each of the magnetostrictive vibrators 9, the output of the key switch 10 being connected to the magnetostrictive vibrator 9. One of the inputs of the aforementioned key switch is connected to a modulator 11, whereas the second input of said key switch is connected to a program selector switch 12.

One of the inputs of the modulator 11 is connected to an electric-pulse ultrasonic-frequency generator 13, whereas the second input of said modulator is connected to a pulse generator 14 which is capable of periodically feeding square-shaped pulses to the modulator.

The electric-pulse ultrasonic-frequency generator 13, the pulse generator 14 and the program selector switch 12, are connected to a power supply unit 15 which in turn is connected to the power supply line 8 via the switch 7.

In case of necessity a power amplifier 16 (FIG. 3) may be inserted in the circuit between each of the magnetostrictive vibrators 9 and the key switch 10.

One of the inputs of the aforementioned power amplifier is connected via a program selector switch 17 to the modulator 11, while the second input of said power amplifier is connected to the output of the key switch 10.

One of the inputs of the key switch 10 is connected to an electric power accumulator such as a capacitor 18 which through the program selector switch 17 is connected to the power supply unit 15, the second input of the above-mentioned key switch 10 being connected to the pulse generator.

The electric power system of the device adapted for deicing the surface of thin-walled structures, operates as follows.

To provide ice protection of the skin 1 (FIG. 1), the power supply unit 6 is connected to the aircraft power supply line 8 either manually or automatically through the use of the switch 7.

The above-mentioned power supply unit is capable of supplying current at the required potential difference to both the capacitor 4 and the program selector switch 5. The capacitor 4 is continuously charged by direct current from the power supply unit and is discharged through the electromagnetic induction coil 2 with the key switch 3 open.

The program selector switch 5 alternatively switches in each of the key switches 3 to the capacitor 4 for the time required for said capacitor to be discharged. After a time interval required for the capacitor to be charged, the program selector switch 5 causes the next key switch to open.

The electromagnetic induction coil converts the single current pulse received from the capacitor into mechanical vibrations imparted to the skin to deice the surface thereof.

The operation of the electric power system in the mode of feeding a "bundle of waves" is as follows:

To provide ice protection of the skin 1 (FIG. 2), the power supply unit 15 is connected to the aircraft supply line 8 either manually or automatically through the use of the switch 7. The above-mentioned power supply unit is capable of supplying the following required kinds of electric power, that is direct current at a required potential difference and a low-frequency alternating current.

The electric-pulse ultrasonic-frequency generator 13 is adapted for producing current at the required frequency and potential difference. The pulse generator 14 is capable of periodically feeding square-shaped pulses both to the modulator 11 and to the respective key switch 10 as connected by the program selector switch 12.

Upon receiving a square-shaped pulse, the modulator 11 passes a number of high-frequency current oscillations, that is a "bundle of waves," whereas during the space or pause between the square-shaped pulses involved, the modulator 11 inhibits the passage of current oscillations arriving from the generator 13.

Figure 3:
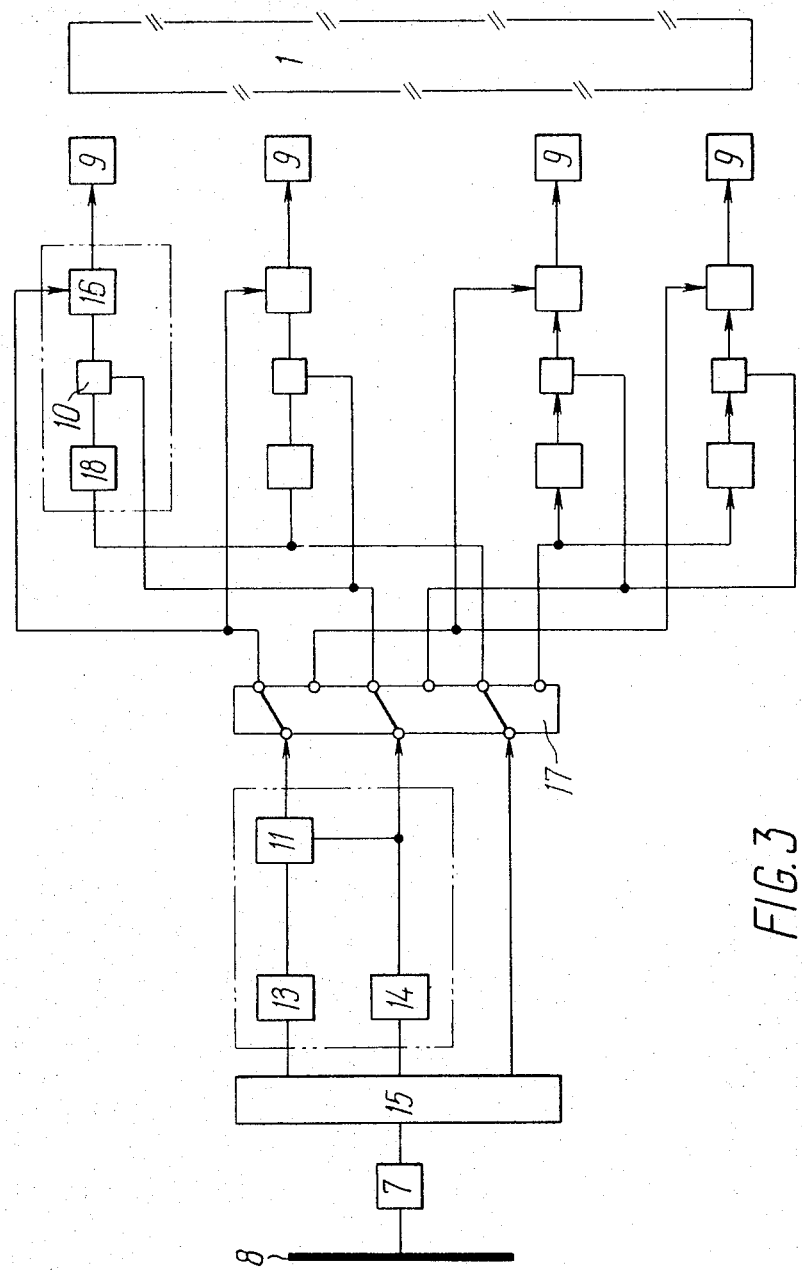
FIG. 3 is a block diagram of the device of FIG. 1 featuring a power amplifier and an electric power accumulator, according to the invention.

The program selector switch 17 (FIG. 3) features three channels and is adapted to alternatively switch in the aforementioned channels to the respective magnetostrictive vibrator 9 or to a cluster of such vibrators (FIG. 3 illustrates the alternative switching of the above-mentioned channels to each pair of the magnetostrictive vibrators).

In the vibrator 9, when switched in by the program selector switch 17, the capacitor 18 is continuously charged by direct current and is discharged through the key switch 10 at the instant the latter is fed with a square-shaped pulse arriving from the pulse generator 14.

The power amplifier 16, having received simultaneously a pulse delivery, both the powerful current from the capacitor 18 which is being discharged and the "bundle of waves" from the modulator 11, feeds a powerful "bundle of waves" to the magnetostrictive vibrator 9, the latter being capable of converting a "bundle" of electrical waves into a "bundle" of mechanical vibrations imparted to the skin to deice the surface thereof.

In the description of the particular embodiments of the present invention disclosed above, specific narrow terminology has been resorted to for the sake of clarity, dealing with specific arrangements of components and specific adaptation and combination of said components into units. However, the invention is not intended to be limited to the specific terms so selected, to the specific arrangement of components and to the specific combination thereof, and it is to be understood that each specific term includes all technical equivalents which operate in a similar manner to accomplish a similar purpose and that other possible arrangements of components and other combinations of said components into units are possible while carrying out the hereindescribed operation of the electric power system.

Though this invention has been described herein with reference to a preferred embodiment, it will be understood that minor changes in the details of construction may be made without departing from the spirit and scope of the invention, as will be readily understood by those skill in the art.

All these alterations and changes will be considered to remain within the limits of the spirit and scope of the invention and the claims that follow.

What is claimed is:

1. An electric system of a device for deicing the surface of thin-walled structures, mostly the skin surface of aircrafts, comprising: a power supply unit; an electric-pulse ultrasonic- or audio-frequency generator connected to said power supply unit; a pulse generator connected to said power supply unit; a modulator one of whose inputs is connected to said electric pulse generator, whereas the second input of said modulator is connected to said pulse generator; a program selector switch connected to said power supply unit; converters adapted to convert electric pulses into mechanical pulses, said converters being provided in a close proximity to said skin; key switches made as electron tubes and provided one by one before each of said converters; each of said key switches being electrically connected by its input to said respective converter, whereas one of the inputs of said key switches is connected to said modulator, while the second input of said key switch is connected to both the power supply unit and the program selector switch adapted to switch in the respective key switch to the modulator.

2. An electric system as claimed in claim 1 wherein provided before each of the converters adapted to convert electric oscillations into mechanical oscillations, is a power amplifier one of whose inputs is connected via a program selector switch to the modulator, whereas the second input of said power amplifier is connected to the key switch, one of whose inputs being connected via an electric power accumulator and a program selector switch, to the power supply unit, while the second input of said key switch is likewise connected via the program selector switch to the pulse generator.

3. An electric system as claimed in claim 1 wherein said low inertia converters are magnetostrictive vibrators.

* * * * *